US012482404B2

(12) United States Patent
Jeong

(10) Patent No.: US 12,482,404 B2
(45) Date of Patent: Nov. 25, 2025

(54) DISPLAY DEVICE AND OPERATION METHOD THEREOF

(71) Applicant: LG ELECTRONICS INC., Seoul (KR)

(72) Inventor: Wonsang Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/685,695

(22) PCT Filed: Sep. 15, 2021

(86) PCT No.: PCT/KR2021/012626

§ 371 (c)(1),
(2) Date: Feb. 22, 2024

(87) PCT Pub. No.: WO2023/042931

PCT Pub. Date: Mar. 23, 2023

(65) Prior Publication Data

US 2024/0371313 A1 Nov. 7, 2024

(51) Int. Cl.
*G09G 3/20* (2006.01)

(52) U.S. Cl.
CPC ....... *G09G 3/2096* (2013.01); *G09G 2320/02* (2013.01); *G09G 2320/041* (2013.01)

(58) Field of Classification Search
CPC ............. G09G 3/2096; G09G 2320/02; G09G 2320/041
See application file for complete search history.

(56) References Cited

U.S. PATENT DOCUMENTS

| | | | | |
|---|---|---|---|---|
| 2011/0134155 | A1 | 6/2011 | Woo et al. | |
| 2019/0088204 | A1* | 3/2019 | Zhang | G09G 3/3258 |
| 2020/0212810 | A1 | 7/2020 | Kim | |
| 2021/0174735 | A1 | 6/2021 | Choi et al. | |

FOREIGN PATENT DOCUMENTS

| | | | | |
|---|---|---|---|---|
| JP | 2009038927 | | 2/2009 | |
| KR | 20070004385 | A * | 1/2007 | G06F 1/26 |
| KR | 1020070004385 | | 1/2007 | |
| KR | 1020110065172 | | 6/2011 | |
| KR | 1020190106063 | | 9/2019 | |
| KR | 1020200079981 | | 7/2020 | |

OTHER PUBLICATIONS

PCT International Application No. PCT/KR2021/012626, International Search Report dated Jun. 13, 2022, 2 pages.

* cited by examiner

*Primary Examiner* — Towfiq Elahi
(74) *Attorney, Agent, or Firm* — LEE, HONG, DEGERMAN, KANG & WAIMEY

(57) ABSTRACT

A display device according to an embodiment of the present invention may comprise: a display panel; a back-end interface which transmits image data to the display panel; a memory which stores an initial setting voltage; and a processor which senses an input voltage output from a DC/DC converter and transmitted to the back-end interface, compares the sensed input voltage with the initial setting voltage, acquires a voltage compensation value on the basis of a result of the comparison, and transmits the acquired voltage compensation value to the DC/DC converter.

13 Claims, 7 Drawing Sheets

600

| EXTERNAL TEMPERATURE (DEGREES) | VOLTAGE COMPENSATION VALUE (V) |
|---|---|
| 5 | 0.92 |
| 10 | 0.95 |
| 15 | 0.97 |
| 20 | 1 |

DISPLAY DEVICE AND OPERATION METHOD THEREOF

CROSS-REFERENCE TO RELATED APPLICATION(S)

This application is the National Stage filing under 35 U.S.C. 371 of International Application No. PCT/KR2021/012626, filed on Sep. 15, 2021, the contents of which are all incorporated by reference herein in its entirety.

TECHNICAL FIELD

The present disclosure relates to a display device and an operation method thereof.

BACKGROUND ART

In recent years, display devices that support ultra-high resolutions have emerged.

An 8K display has approximately 8,000 horizontal pixels. 8K Ultra High Definition (8K UHD) is the highest level of resolution that can be achieved with current display technology.

However, in the case of an 8K display, image noise such as a vertical image bar may occur as a VCM level, which is the output voltage level of the back-end, is outside the range of specifications depending on an external temperature, a back-end setting value, or an SoC process.

In addition, as a physical pattern length becomes longer as the display becomes larger, a difference in pattern length between the lower central portion of a module closest to a main board and an outermost portion may cause a significant difference in impedance between physical patterns, resulting in a difference in VCM Level.

As the number of output lines (source lines) increases with high-resolution displays such as 8K, there is also the problem of severe deviation in VCM level between lines.

DISCLOSURE OF INVENTION

Technical Problem

The purpose of the present disclosure is to provide a display device capable of minimizing a deviation in the output voltage level of an back-end interface.

The purpose of the present disclosure is to maintain the output voltage level of an back end interface constant.

Technical Solution

According to an embodiment of the present disclosure, a display device may include a display panel, a back-end interface configured to transmit image data to the display panel, a memory configured to store an initial set voltage, and a processor configured to sense an input voltage output from a DC/DC converter and transmitted to the back-end interface, compare the sensed input voltage with the initial set voltage, obtain a voltage compensation value based on a comparison result, and transfer the obtained voltage compensation value to the DC/DC converter.

Advantageous Effects

According to various embodiments of the present disclosure, image noise may be removed by minimizing a deviation in the output voltage level of an back-end interface.

Further, the deviation in the output voltage level of the back-end interface is minimized despite a change in external temperature, enabling a user not to experience discomfort when watching video.

BEST MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
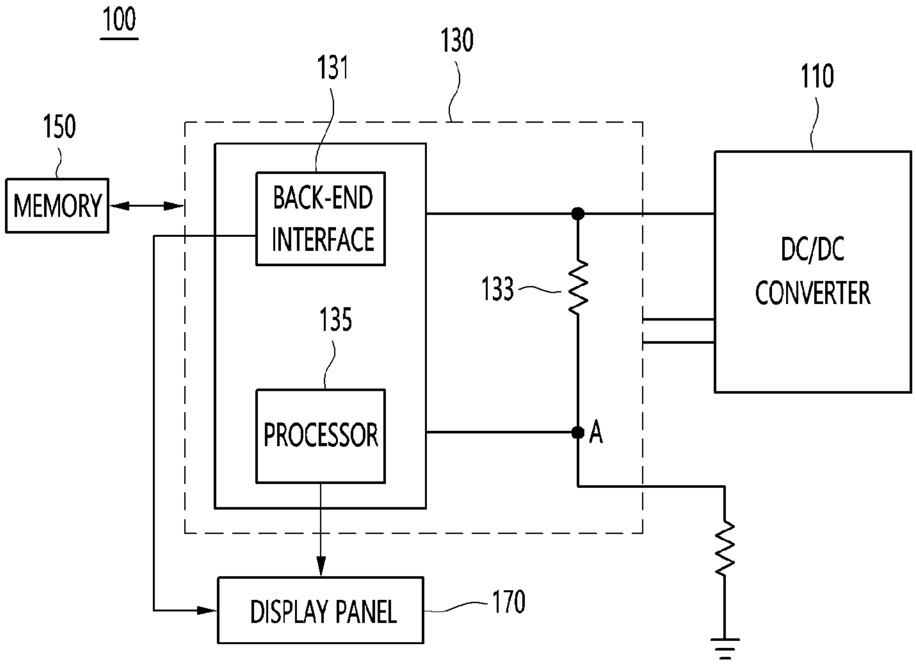
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a DC/DC converter 110, a system on a chip (SoC) 130, a memory 150, and a display panel 170.

The DC/DC converter 110 may step up or step down direct current (DC) power transferred from a power supply (not shown) and output the same.

The SoC 130 may control the overall operation of the display device 100. The SoC 130 may be referred as a main board.

The Soc 130 may include a back-end interface 131, a resistor 133, and a processor 135.

The back-end interface 131 may receive a voltage input from the DC/DC converter 110. The voltage input to the back-end interface 131 may be referred as Vterm, and the output voltage of the back-end interface 131 may be referred as Vcm.

The back-end interface 131 may transmit data to the display panel 170 through the Vx1 (V-by-one) standard. The data may be RGB data associated with an image to be output to the display panel 170.

The resistor 133 may divide Vterm. For example, the resistor 133 may have a value that causes Vterm/2 across the resistor, but this is only an example.

The processor 135 may sense a voltage divided through the resistor 133. That is, the processor 135 may measure a voltage dropped by the resistor 133.

Based on the sensed voltage, the processor 135 may determine a voltage compensation value and transfer the determined voltage compensation value to the DC/DC converter 110.

The memory 150 may store an initial setting voltage. The initial setting voltage may be Vterm initially output to the DC/DC converter 110 after the power is turned on.

The memory 150 may store a compensation table that matches external temperatures to voltage compensation values corresponding to those temperatures.

The display panel 170 may output an image based on the RGB data received from the SoC 130.

The display panel 170 may be a panel composed of organic light-emitting diodes.

Figure 2:
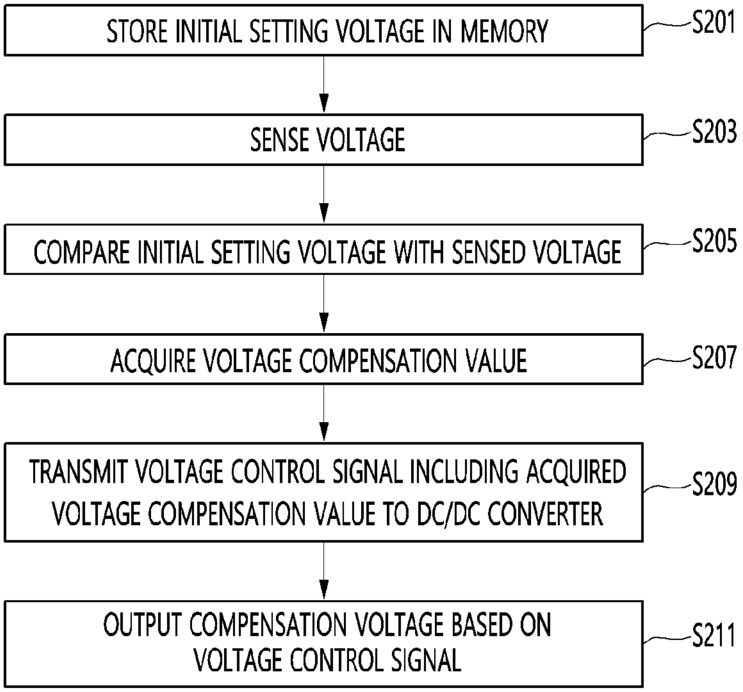
FIG. 2 is a flow chart for describing an operation method of a display device according to an embodiment of the present disclosure.

FIG. 2 is a flow chart for describing an operation method of a display device according to an embodiment of the present disclosure.

Referring to FIG. 2, the processor 135 may store an initial setting voltage in the memory 150 (S201).

In one embodiment, the initial setting voltage may be a setting value output by the back-end interface 131.

The back-end interface 131 may transmit RGB data to the display panel 170.

The back-end interface 131 may transmit the RGB data to the display panel 170 using the Vx1 standard.

In one embodiment, the initial setting voltage may be determined based on user settings.

In another embodiment, the initial setting voltage may be a voltage output by the back-end interface 131 after one to two minutes have elapsed since the display device 100 is powered on. The reason for this is to read a voltage setting value of the back-end interface 131 which is stable, at room temperature.

The voltage output by the back-end interface 131 may be referred to as a voltage common mode (VCM) level, which is a voltage under a common mode.

The VCM level may be dependent to a voltage (Vterm level) transferred from the DC/DC converter 110 to the back-end interface 131.

That is, the voltage input to the back-end interface 131 may be referred to as a Vterm level, and the voltage output by the back-end interface 131 may be referred to as a VCM level.

That is, the VCM level and the Vterm level may have the same magnitude, or the same change ratio.

Thereafter, the processor 135 may sense the voltage input to the back-end interface 131 (S203).

In one embodiment, the processor 135 may sense a voltage input to the back-end interface 131 from the DC/DC converter 110.

In another embodiment, the processor 135 may measure a voltage at a point (point A in FIG. 1) where the voltage input from the DC/DC converter 110 to the back-end interface 131 is divided through the resistor 133.

To this end, the processor 135 may include a voltage measurement circuit for voltage sensing.

The voltage measurement circuit may sense the half of the voltage input to the back-end interface 131.

The processor 135 may compare the sensed voltage to the initial setting voltage stored in the memory 150 (S205).

The processor 135 may compare the initial setting voltage and the sensed voltage to determine the need of compensation for the voltage output by the back-end interface 131.

Based on the result of the comparison of the initial setting voltage and the sensed voltage, the processor 135 may obtain a voltage compensation value (S207).

The processor 135 may obtain a difference between the initial setting voltage and the sensed voltage as the voltage compensation value.

For example, the processor 135 may determine that when the sensed voltage is greater than the initial setting voltage, the voltage compensation value has a value of +, and when the sensed voltage is less than the initial setting voltage, the voltage compensation value has a value of −.

The processor 135 may transmit a voltage control signal including the obtained voltage compensation value to the DC/DC converter 110 (S209).

The processor 135 may transfer the voltage compensation value to the DC/DC converter 110 to regulate a voltage input to the back-end interface 131.

Specifically, the processor 135 may transmit, to the DC/DC converter 110, the voltage control signal for regulating the voltage input to the back-end interface 131 by the voltage compensation value.

In another example, the processor 135 may transfer a voltage reflecting the voltage compensation value to the DC/DC converter 110.

The processor 135 may transmit the voltage control signal to the DC/DC converter 110 through the I2C standard. The I2C standard may be a standard defining that data is transmitted/received via two signal lines.

Based on the voltage control signal received from the processor 135, the DC/DC converter 110 may output a compensation voltage to the back-end interface 131 (S211).

For example, when the voltage compensation value is +0.5 volts, the compensation voltage may be a value obtained by adding 0.5 volts to a voltage previously transferred to the back-end interface 131.

When the voltage compensation value is-0.5 volts, the compensation voltage may be a value obtained by subtracting 0.5 volts from the voltage previously transferred to the back-end interface 131.

Then, returning to step S203, the steps may be repeatedly performed.

As described above, according to an embodiment of the present disclosure, it is possible to remove image noise such as an image bar, by compensating the voltage of the back-end interface 131, which may vary depending on a temperature, or a process.

Accordingly, a user may not feel uncomfortable watching the 8K video.

Figure 3:
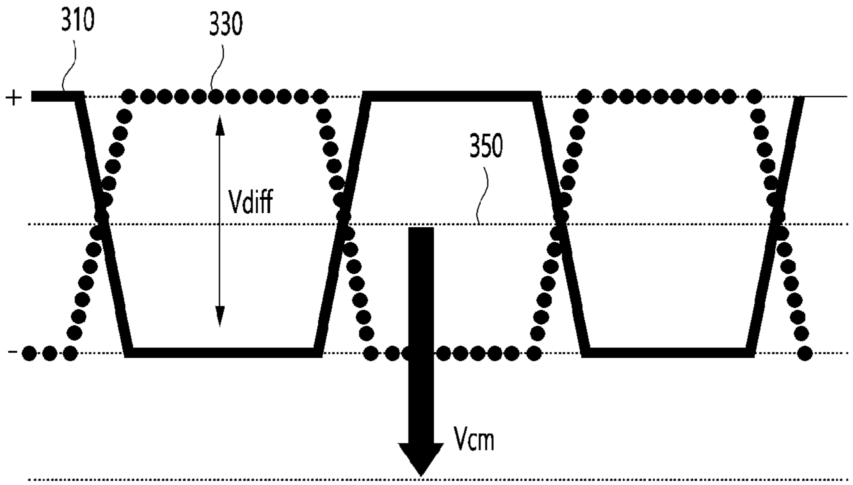
FIG. 3 is a diagram for describing a deviation in Vcm level according to the prior art.
Figure 4:
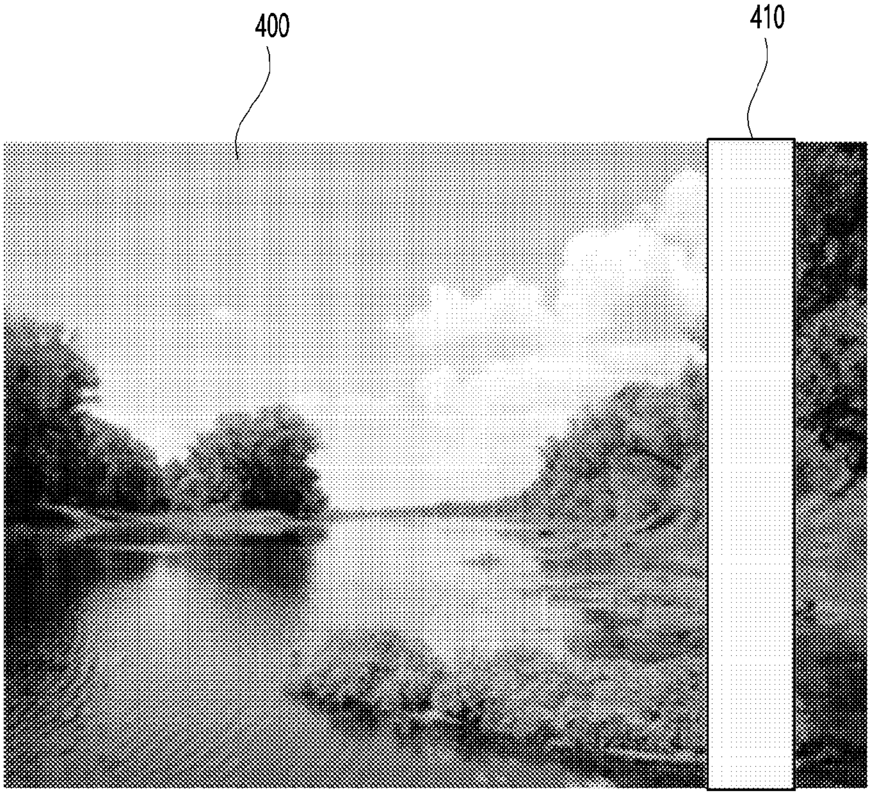
FIG. 4 is a diagram for describing a phenomenon that may occur according to the deviation in Vcm level.

FIG. 3 is a diagram for describing a deviation in Vcm level according to the prior art, and FIG. 4 is a diagram for describing a phenomenon that may occur according to the deviation in Vcm level.

Referring to FIG. 3, a positive voltage swing level 310, a negative voltage swing level 330, and a reference Vcm level 350 are shown.

Each voltage swing level may represent a magnitude of a voltage that carries information of image data.

The reference Vcm level 350 may be a level which is a reference to determine whether a voltage swing level is 1 or 0.

The Vcm level 350 may be a level of a voltage output by the back-end interface 131.

The Vcm level may vary (decrease or increase) when a temperature at a place where the display device 100 is placed is a high-temperature or low-temperature.

Further, the Vcm level may decrease depending on the design process of the SoC.

Further, the Vcm level may vary depending on the setting value of the voltage swing level.

As described above, when the Vcm level varies due to various factors, a noisy image such as a vertical image bar 410 may be displayed, as shown in FIG. 4.

The vertical image bar 410 may be a black image or a white image. A user may feel uncomfortable watching a video due to the occurrence of image noise, such as the vertical video bar 410.

According to the embodiment of FIGS. 1 and 2, an input voltage input to the back-end interface 131 may be dependent to an output voltage of the back-end interface 131.

The magnitude of the input voltage input to the back-end interface 131 may be the Vterm level, and the magnitude of the output voltage of the back-end interface 131 that is dependent to Vterm may be the Vcm level.

According to an embodiment of the present disclosure, it is possible to detect a variation in the Vcm level and perform voltage compensation by the amount of variation detected, to prevent the Vcm level from changing. Accordingly, the effect of removing the noise of images may be obtained by minimizing the deviation in Vcm.

Next, an operation method of a display device according to another embodiment of the present disclosure will be described.

Figure 5:
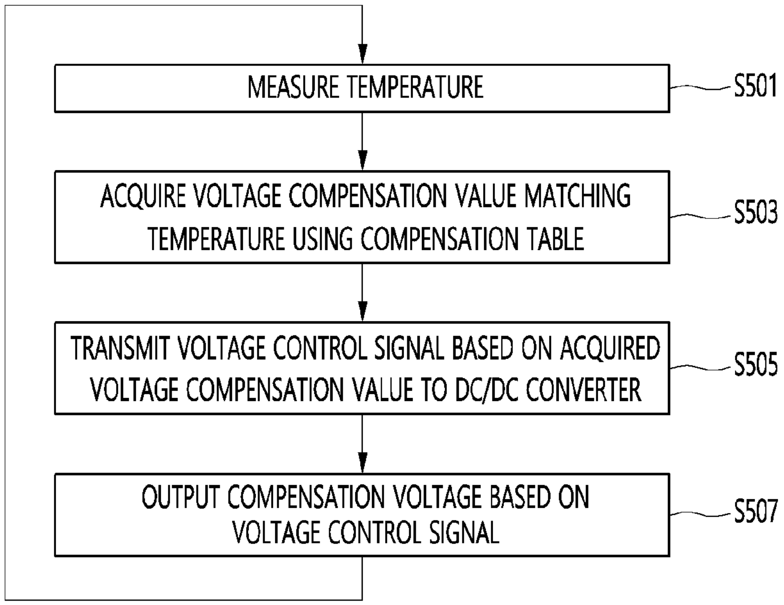
FIG. 5 is a flowchart for describing an operation method of a display device according to another embodiment of the present disclosure.

FIG. 5 is a flowchart for describing an operation method of a display device according to another embodiment of the present disclosure.

In particular, unlike FIG. 2, FIG. 5 is a diagram for describing an embodiment in which a voltage compensation value is obtained by using a compensation table storing a temperature-dependent voltage compensation value without sensing a voltage input to the back-end interface 131.

Referring to FIG. 5, the processor 135 may measures an ambient temperature of the display device 100 (S501).

For temperature measurement, the display device 100 may include a separate temperature sensor.

In another example, the temperature sensor may be included in the processor 135.

In still another example, the processor 135 may receive a temperature via an external input.

The processor 135 may obtain a voltage compensation value corresponding to the measured temperature using a compensation table stored in the memory 150 (S503).

The compensation table may be a table representing a correlation relationship between temperatures and voltage compensation values.

The compensation table will be described with reference to FIG. 6.

Figures 6, 7:
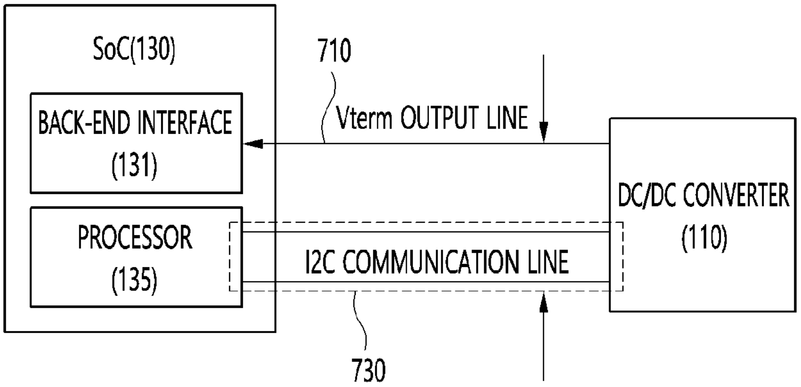
FIG. 6 is a diagram for describing a compensation table according to an embodiment of the present disclosure.
FIGS. 7 to 9 are diagrams for describing a method of detecting an embodiment of the present disclosure.

FIG. 6 is a diagram for describing a compensation table according to an embodiment of the present disclosure.

Referring to FIG. 6, a compensation table 600 is illustrated, which represents a correspondence between an external temperature and a voltage compensation value.

The compensation table 600 may be stored in the memory 150 or the processor 135.

The compensation table 600 may store a matching relationship between an external temperature of the display device 100 and a voltage compensation value corresponding to the external temperature.

For example, the processor 135 may determine the voltage compensation value for the input voltage of the back-end interface 131 to be 1 volt, when the external temperature is 20 degrees.

In other words, the processor 135 may read a voltage compensation value corresponding to an external temperature from the compensation table 600 when information about the external temperature is obtained.

The processor 135 may generate a compensation voltage that reflects the extracted voltage compensation value in an initial voltage value stored in the memory 150.

In one embodiment, the processor 135 may transmit a voltage control signal that instructs the DC/DC converter 110 to output the compensation voltage to the DC/DC converter 110.

In another example, the processor 135 may transmit only the voltage compensation value to the DC/DC converter 110. The DC/DC converter 110 may output, to the back-end interface 131, a compensation voltage that reflects the voltage compensation value in the initial voltage value.

A description will be given again with reference to FIG. 5.

The processor 135 may transmit a voltage control signal generated based on the obtained voltage compensation value to the DC/DC converter 110 (S505).

The processor 135 may transmit the voltage control signal including the obtained voltage compensation value to the DC/DC converter 110 through the I2C communication standard.

Based on the voltage compensation value, the processor 135 may generate a compensation voltage to be output by the DC/DC converter 110 and transmit a voltage control signal including the generated compensation voltage to the DC/DC converter 110.

The DC/DC converter 110 may output the compensation voltage based on the voltage control signal (S507).

When the voltage control signal includes a voltage compensation value, the DC/DC converter 110 may output, to the back-end interface 131, a compensation voltage that reflects the voltage compensation value in the initial voltage value.

The DC/DC converter 110 may output the compensation voltage when the voltage control signal includes the compensation voltage reflecting the voltage compensation value in the initial voltage value. Accordingly, the back-end interface 131 may receive a voltage identical to an initial voltage.

As described above, according to an embodiment of the present disclosure, the voltage compensation value may be obtained merely by measuring an external temperature, without sensing a voltage input to the back-end interface 131. As the voltage compensation value is obtained, the input voltage or output voltage of the back-end interface 131 may become constant.

Accordingly, a deviation in the Vcm level may be minimized, thus removing a noise in images.

Figure 8:
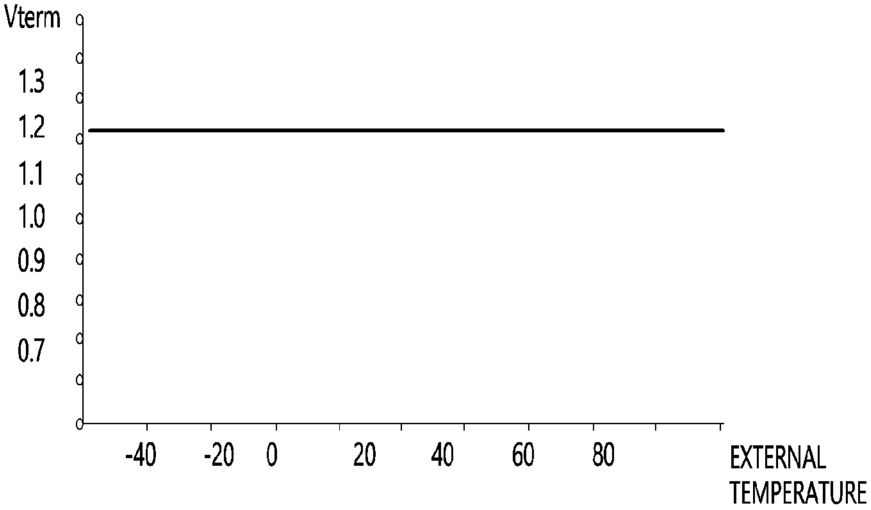
Figure 9:
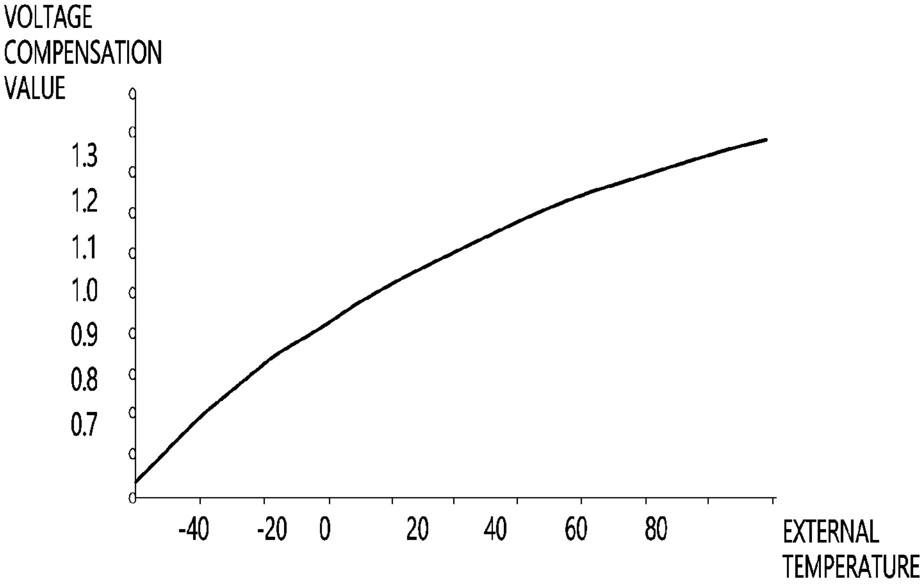

FIGS. 7 through 9 are diagrams for describing a method of detecting embodiments of the present disclosure.

First, a description will be given with reference to FIG. 7.

The SoC 130 may include the back-end interface 131 and the processor 135.

The back-end interface 131 may be connected to the DC/DC converter 110 via a Vterm output line 710.

The Vterm output line 710 may be a line through which Vterm output from the DC/DC converter 110 is input to the back-end interface 131.

The processor 135 may be connected to the DC/DC converter 110 via an I2C communication line 730 compliant with the I2C standard.

The Vterm input to the back-end interface 131 may be measured via the Vterm output line 710.

When an embodiment of the present disclosure is applied, a constant voltage may be output from the DC/DC converter 110, regardless of the external temperature. This is because the DC/DC converter 110 has been controlled to output a constant voltage through the voltage compensation value.

Thus, it may be determined that the embodiment of the present disclosure has been applied when the Vterm measured at the Vterm output line 710 is constant, regardless of a change in external temperature, as shown in FIG. 8.

The voltage compensation value may be transferred to the DC/DC converter 110 from the processor 135 or the back-end interface 131 via the I2C communication line 730.

That is, the voltage compensation value may be measured via the I2C communication line 730.

When the embodiment of the present disclosure is applied, the measured voltage compensation value may vary depending on a temperature. This is because the Vcm level (or Vterm level) varies as a temperature changes, and the voltage compensation value varies accordingly.

Thus, as shown in FIG. 9, when a voltage value measured at the I2C communication line 730 varies according to a change in external temperature, it may be determined that the embodiment of the present disclosure has been applied.

In general, the voltage compensation value may increase as the temperature increases.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device comprising:

a display panel;

a back-end interface configured to transmit image data to the display panel;

a memory configured to store an initial setting voltage; and a processor configured to sense an input voltage output from a DC/DC converter and transmitted to the back-end interface, compare the sensed input voltage with the initial setting voltage, acquire a voltage compensation value on a basis of a result of the comparison, and transfer the acquired voltage compensation value to the DC/DC converter; and, a resistor connected to an output line connecting the DC-DC converter and the back-end interface to divide the input voltage, wherein the resistor includes one end connected to the output line and an other end connected to the processor.

2. The display device of claim 1, wherein the processor is configured to acquire a value acquired by subtracting the input voltage from the initial setting voltage as the voltage compensation value.

3. The display device of claim 1, wherein the processor is configured to measure a voltage dropped by the resistor, compare the measured voltage with the initial setting voltage, and acquire the voltage compensation value on the basis of the result of the comparison.

4. The display device of claim 1, wherein the initial setting voltage is a voltage measured at the other end of the resistor when a predetermined period of time has elapsed after the display device is turned on.

5. The display device of claim 1, wherein the processor is configured to measure a voltage at the output line, and the measured voltage is constant according to an external temperature.

6. The display device of claim 1, wherein the processor is configured to measure a voltage at an I2C line connecting the processor and the DC/DC converter, and the measured voltage varies according to an external temperature.

7. The display device of claim 1, wherein the display panel and the back-end interface are connected through Vx1 (V-by-one) standard, and wherein the processor and the DC/DC converter are connected through I2C standard.

8. An operating method of a display device, the display device including a display panel, a back-end interface that transmits image data to the display panel, a processor, and a resistor that includes one end connected to an output line and an other end connected to the processor, the operating method comprising:

sensing an input voltage output from a DC/DC converter and transmitted to the back-end interface, comparing the sensed input voltage with an initial setting voltage, acquiring a voltage compensation value on a basis of a result of the comparison, transferring the acquired voltage compensation value to the DC/DC converter, and dividing the input voltage using the resistor that is connected to the output line connecting the DC-DC converter and the back-end interface.

9. The operating method of claim 8, wherein the acquiring of the voltage compensation value includes acquiring a value obtained by subtracting the input voltage from the initial setting voltage as the voltage compensation value.

10. The operating method of claim 8, wherein the acquiring of the voltage compensation value includes measuring a voltage dropped by the resistor, comparing the measured voltage with the initial setting voltage, and acquiring the voltage compensation value on the basis of the result of the comparison.

11. The operating method of claim 8, wherein the initial setting voltage is a voltage measured at the other end of the resistor when a predetermined period of time has elapsed after the display device is turned on.

12. The operating method of claim 8, wherein the measured voltage is constant according to an external temperature.

13. A display device comprising:

a display panel;

a back-end interface configured to transmit image data to the display panel;

a memory configured to store an initial setting voltage; and a processor configured to sense an input voltage output from a DC/DC converter and transmitted to the back-end interface, compare the sensed input voltage with the initial setting voltage, acquire a voltage compensation value on a basis of a result of the comparison, and transfer the acquired voltage compensation value to the DC/DC converter, wherein a voltage is measured at an I2C line connecting the processor and the DC/DC converter, and the measured voltage varies according to an external temperature.

* * * * *